July 25, 1950 V. STEWART 2,516,352
PASSENGER-CARRYING DEVICE FOR BICYCLES
Filed Oct. 1, 1948

INVENTOR.
Victor Stewart
BY Harry Radzinsky
Attorney

Patented July 25, 1950

2,516,352

UNITED STATES PATENT OFFICE 2,516,352

PASSENGER-CARRYING DEVICE FOR BICYCLES

Victor Stewart, New York, N. Y.

Application October 1, 1948, Serial No. 52,351

2 Claims. (Cl. 155—5.12)

This invention relates to passenger-carrying seats for bicycles, and has for one of its objects the provision of a simple, sturdy device, readily applicable to a bicycle of standard construction and by which a passenger can be carried on the bicycle in such a manner as not to interfere with or impede the normal pedalling and steering of the bicycle by the operator.

I am aware that prior to the present invention, efforts have been made to apply passenger-carrying attachments or tandem seats to bicycles, most of such devices comprehending the employment of clamps, braces, and various types of fittings, rendering the structure not only difficult to fit on the bicycle, but adding materially to the overall weight of the bicycle. The present invention therefore contemplates the provision of means for supporting a passenger seat at the rear of the operator's seat, such means consisting of a simple rearward, horizontally-disposed extension of the seat post of the bicycle and on which the passenger seat or saddle is mounted. The above-described arrangement is such that the fitting of a seat post, constructed as above described is all that is required to result in the installation of the passenger seat.

The invention results in the accomplishment of other objects to be hereinafter set forth and more particularly pointed out in the claims appended hereto.

Figure 1:
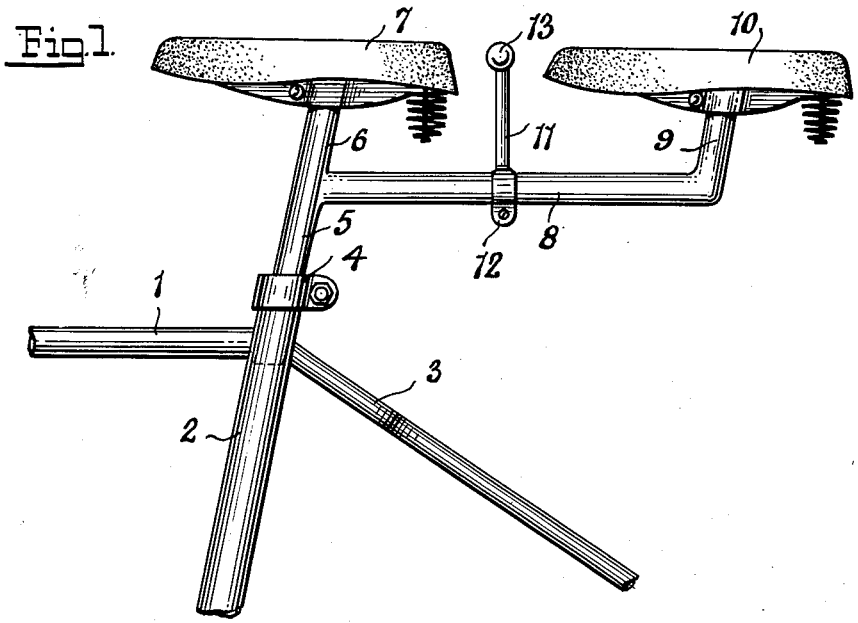
Figure 2:
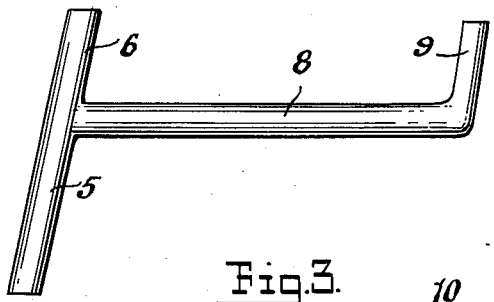
Figure 3:
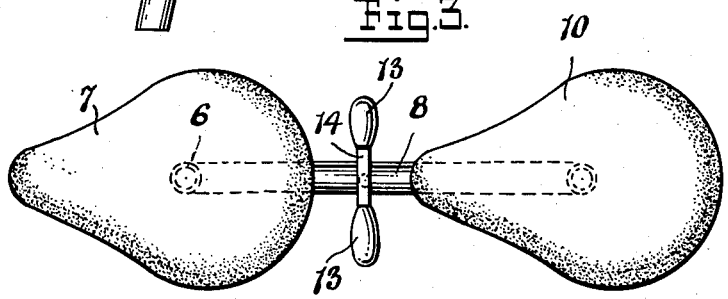

In the accompanying drawing, wherein an illustrative embodiment of the invention is disclosed, Fig. 1 is a side elevation of parts of a bicycle frame, showing the improved passenger-carrying device applied to the same; Fig. 2 is a side elevation of the seat support detached from the bicycle and with the seats or saddles removed, and Fig. 3 is a top plan view of the device.

Referring to the drawing, 1 indicates the top bar of a bicycle frame of standard construction, and to which is attached the conventional seat-supporting tube 2. The rear fork, in which the rear wheel is accommodated, is shown at 3. These elements are all parts of a standard bicycle and may vary in arrangement and positioning according to the design of the bicycle, and without affecting the present invention.

The seat-supporting structure includes a seat post 5 which is telescopically and adjustably received in the tube 2 in the known manner and is held therein in any desired position of adjustment by means of the clamp 4. Extending laterally and rearwardly from the seat post 5 is a supporting rod 8 intended to receive and support the passenger-carrying seat or saddle 10. Said seat or saddle 10 may be of conventional or standard form and is clamped on the upright or substantially vertical and integral extension 9 located at the free end of the supporting rod 8.

The rod 8 is preferably formed as an integral extension of the seat post 5 and said rod may be integrally attached to the post 5 by being welded thereto or by the use of a T-fitting or other means by which a very secure and firm attachment of the supporting rod 8 to the post is attained. A secure and strong joint at this point is desirable because such joint is the sole point of support for the rod 8. The resulting structure is shown in Fig. 2 wherein it will be noted that the supporting means for the two saddles consists of an integral frame preferably composed of tubing for lightness, and having the lower part 5 for reception in the frame tube 2; an upper portion 6 on which the operator's seat or saddle 7 is mounted, and the rearward extension 8 having an upturned end portion 9 for the reception of the passenger's seat or saddle 10.

The supporting rod 8 is made of sufficient length to locate the passenger sufficiently to the rear of the operator to avoid interference with the operator while pedalling and steering the bicycle. To enable the passenger carried on the rear seat 10 to balance himself and comfortably maintain his position on the saddle 10, a handhold is provided, and in the illustrated form, the same consists of a post 11 attached to the supporting rod 8 between the two saddles by means of a suitable clamp 12. At the top, the post is provided with a cross-bar 14 carrying the grips or handles 13 which can be comfortably grasped in the hands.

The passenger's feet may be supported on footrests not shown, since the same are known in this art, but such foot-rests may be simple extensions of the rear axle of the bicycle or may be attached at the axle or to the frame at such positions as to enable the passenger to retain the feet thereon while seated on the saddle 10.

The construction of the passenger-carrying device is such that it may be readily placed in position on any standard bicycle by merely removing the conventional seat post by loosening the clamp 4, and inserting the post 5 in place and then tightening the clamp. The saddles 7 and 10 are conventional bicycle saddles and may be readily fitted upon the parts 6 and 9. Since the supporting rod 8 is supported solely by the seat post 5, the fitting of said post 5 in the tube 2 is all that is required to mount the passenger-carrying device.

It will be noted that in the form illustrated, the portions 6 and 9 of the structure are shown as being substantially of the same height so that the saddles are maintained at the same level. If desired, the saddles may be maintained at different levels; the hand-hold may be changed as to construction or form, or it might be provided as an integral extension of the rod 8. These and other variations are contemplated as being within the scope of the invention and the claims appended hereto.

What I claim is:

1. A device of the character described comprising, a bicycle frame having a seat post receiving tube, a seat post adjustably and removably mounted in said tube, an operator's saddle carried at the upper end of said seat post, a tubular rearward extension on said seat post, said extension extending substantially horizontal, a passenger's saddle carried at the end of said extension and at substantially the same level as that of the operator's saddle, the extension being supported wholly by its attachment to the seat post, and a hand-hold located on said extension between the passenger's and operator's saddles, and adjustable along the length of said extension.

2. A device of the character described comprising, a bicycle frame having a seat post receiving tube, a seat post adjustably and removably mounted in said tube, an operator's saddle carried at the upper end of said seat post, a tubular, integral, rearwardly-extending support projecting from the seat post at a point between its saddle and its attachment to the tube, said support extending substantially horizontal and continuously at the same level for its length and being unsupported except by its attachment to the seat post, said support carrying a passenger's saddle adjacent its free end at substantially the same level as the operator's saddle and being provided with a hand-hold between said saddle and the operator's saddle.

VICTOR STEWART.

REFERENCES CITED

The following references are of record in the file of this patent:

UNITED STATES PATENTS

| Number | Name | Date |
|---|---|---|
| 780,175 | Hedstrom | Jan. 17, 1905 |
| 810,814 | Santini | Jan. 23, 1906 |
| 2,358,399 | Kelly | Sept. 19, 1944 |

FOREIGN PATENTS

| Number | Country | Date |
|---|---|---|
| 10,877 | Great Britain | of 1903 |
| 274,295 | Great Britain | July 21, 1927 |